(12) United States Patent
Nies et al.

(10) Patent No.: US 12,512,274 B2
(45) Date of Patent: Dec. 30, 2025

(54) WET ELECTROLYTIC CAPACITOR CONTAINING A GELLED WORKING ELECTROLYTE

(71) Applicant: KYOCERA AVX Components Corporation, Fountain Inn, SC (US)

(72) Inventors: Craig Nies, Greenville, SC (US); Hari Kishan Rao Abbaraju, Simpsonville, SC (US); Naomi Lollis, Fountain Inn, SC (US); Jan Petrzilek, Usti nad Orlici (CZ)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 21 days.

(21) Appl. No.: 18/357,260

(22) Filed: Jul. 24, 2023

(65) Prior Publication Data

US 2024/0096563 A1 Mar. 21, 2024

Related U.S. Application Data

(60) Provisional application No. 63/401,261, filed on Aug. 26, 2022.

(51) Int. Cl.
*H01G 9/025* (2006.01)
*H01G 9/00* (2006.01)
*H01G 9/035* (2006.01)
*H01G 9/15* (2006.01)

(52) U.S. Cl.
CPC ........... *H01G 9/025* (2013.01); *H01G 9/0036* (2013.01); *H01G 9/035* (2013.01); *H01G 9/15* (2013.01)

(58) Field of Classification Search
CPC .......... H01G 9/145; H01G 9/15; H01G 9/035; H01G 9/025
See application file for complete search history.

(56) References Cited

U.S. PATENT DOCUMENTS

| | | | |
|---|---|---|---|
| 3,138,746 A | 6/1964 | Burger et al. |
| 4,017,302 A | 4/1977 | Bates et al. |
| 4,441,927 A | 4/1984 | Getz et al. |
| 4,469,610 A | 9/1984 | Fukuda et al. |

(Continued)

FOREIGN PATENT DOCUMENTS

| CN | 108155016 A | 6/2018 |
|---|---|---|
| EP | 0 989 572 A2 | 3/2000 |

(Continued)

OTHER PUBLICATIONS

Abstract of Japanese Patent No. JP 04-266009 dated Sep. 22, 1992, 1 page.

(Continued)

*Primary Examiner* — David M Sinclair
(74) *Attorney, Agent, or Firm* — Dority & Manning, P.A.

(57) ABSTRACT

A wet electrolytic capacitor is provided. The capacitor contains an anode comprising an anodically oxidized pellet formed from a pressed and sintered powder, a cathode, and a working electrolyte in communication with the anode and the cathode. The working electrolyte is in the form of a gel and comprises an ammonium salt of an organic acid, inorganic oxide particles, a gelation activator, an acid, and a solvent system that comprises water. The working electrolyte has a pH value of from about 5.0 to about 8.0.

24 Claims, 3 Drawing Sheets

(56) References Cited

U.S. PATENT DOCUMENTS

| | | | |
|---|---|---|---|
| 4,483,819 A | 11/1984 | Albrecht et al. |
| 4,522,737 A | 6/1985 | MacNamee |
| 4,555,268 A | 11/1985 | Getz |
| 4,715,976 A | 12/1987 | Mori et al. |
| 4,762,630 A | 8/1988 | Shinozaki et al. |
| 4,786,429 A | 11/1988 | Mori et al. |
| 4,992,910 A | 2/1991 | Evans |
| 5,098,485 A | 3/1992 | Evans |
| 5,338,472 A | 8/1994 | Yokoyama et al. |
| 5,435,874 A | 7/1995 | Takeuchi et al. |
| 5,469,325 A | 11/1995 | Evans |
| 5,473,503 A | 12/1995 | Sakata et al. |
| 5,507,966 A | 4/1996 | Liu et al. |
| 5,559,667 A | 9/1996 | Evans |
| 5,571,640 A | 11/1996 | Takeuchi et al. |
| 5,737,181 A | 4/1998 | Evans |
| 5,754,394 A | 5/1998 | Evans et al. |
| 5,786,980 A | 7/1998 | Evans |
| 5,894,403 A | 4/1999 | Shah et al. |
| 5,920,455 A | 7/1999 | Shah |
| 5,926,362 A | 7/1999 | Muffoletto et al. |
| 5,982,609 A | 11/1999 | Evans |
| 6,037,077 A | 3/2000 | Nowaczyk |
| 6,096,391 A | 8/2000 | Muffoletto et al. |
| 6,110,622 A | 8/2000 | Frysz et al. |
| 6,157,531 A | 12/2000 | Breyen et al. |
| 6,184,160 B1 | 2/2001 | Yan et al. |
| 6,191,936 B1 | 2/2001 | Webber et al. |
| 6,208,502 B1 | 3/2001 | Hudis et al. |
| 6,219,222 B1 | 4/2001 | Shah et al. |
| 6,224,985 B1 | 5/2001 | Shah et al. |
| 6,275,373 B1 | 8/2001 | Marshall et al. |
| 6,307,732 B1 | 10/2001 | Tsubaki et al. |
| 6,332,900 B1 | 12/2001 | Muffoleto et al. |
| 6,404,619 B1 | 6/2002 | Marshall et al. |
| 6,420,066 B1 | 7/2002 | Frustaci et al. |
| 6,452,784 B2 | 9/2002 | Nakada et al. |
| 6,455,108 B1 | 9/2002 | Muffoletto et al. |
| 6,461,759 B1 | 10/2002 | Miller et al. |
| 6,461,771 B1 | 10/2002 | Frysz |
| 6,468,605 B2 | 10/2002 | Shah et al. |
| 6,522,424 B1 | 2/2003 | Feger et al. |
| 6,562,255 B1 | 5/2003 | Feger |
| 6,587,329 B1 | 7/2003 | Feger |
| 6,589,441 B1 | 7/2003 | Feger |
| 6,594,139 B2 | 7/2003 | Muffoletto |
| 6,594,140 B1 | 7/2003 | Evans et al. |
| 6,599,580 B2 | 7/2003 | Muffoletto et al. |
| 6,613,474 B2 | 9/2003 | Frustaci et al. |
| 6,652,729 B2 | 11/2003 | Melody et al. |
| 6,687,117 B2 | 2/2004 | Liu et al. |
| 6,707,660 B1 | 3/2004 | Evans et al. |
| 6,721,169 B2 | 4/2004 | Melody et al. |
| 6,721,170 B1 | 4/2004 | Evans et al. |
| 6,727,022 B2 | 4/2004 | Gan et al. |
| 6,740,420 B2 | 5/2004 | Muffoletto et al. |
| 6,743,370 B1 | 6/2004 | Feger et al. |
| 6,743,547 B2 | 6/2004 | Gan et al. |
| 6,744,619 B1 | 6/2004 | Feger |
| 6,773,632 B1 | 8/2004 | Marshall et al. |
| 6,788,523 B1 | 9/2004 | Hossick-Schott et al. |
| 6,801,424 B1 | 10/2004 | Nielson et al. |
| 6,828,059 B2 | 12/2004 | Miller et al. |
| 6,842,328 B2 | 1/2005 | Schott et al. |
| 6,859,354 B2 | 2/2005 | Viste et al. |
| 6,888,717 B2 | 5/2005 | Kinard et al. |
| 6,893,777 B2 | 5/2005 | Probst |
| 6,939,774 B2 | 9/2005 | Viste et al. |
| 6,951,576 B1 | 10/2005 | Kinard et al. |
| 7,000,297 B2 | 2/2006 | Frustaci et al. |
| 7,002,790 B2 | 2/2006 | Hossick-Schott et al. |
| 7,038,901 B2 | 5/2006 | Muffoletto et al. |
| 7,072,171 B1 | 7/2006 | Muffoletto et al. |
| 7,079,377 B2 | 7/2006 | Schott et al. |
| 7,081,141 B2 | 7/2006 | Hossick-Schott et al. |
| 7,099,143 B1 | 8/2006 | Fife et al. |
| 7,116,547 B2 | 10/2006 | Seitz et al. |
| 7,169,284 B1 | 1/2007 | Jiang et al. |
| 7,224,576 B2 | 5/2007 | Hossick-Schott |
| 7,244,279 B2 | 7/2007 | Seitz et al. |
| 7,256,982 B2 | 8/2007 | Lessner et al. |
| 7,268,996 B1 | 9/2007 | Dapo et al. |
| 7,271,994 B2 | 9/2007 | Stemen et al. |
| 7,279,015 B2 | 10/2007 | Merker |
| 7,314,685 B2 | 1/2008 | Brown et al. |
| 7,324,329 B2 | 1/2008 | Dweik et al. |
| 7,474,521 B2 | 1/2009 | Hossick-Schott |
| 7,483,260 B2 | 1/2009 | Ziarniak et al. |
| 7,485,240 B1 | 2/2009 | Feger et al. |
| 7,499,260 B2 | 3/2009 | Schott et al. |
| 7,511,943 B2 | 3/2009 | Fife et al. |
| 7,585,428 B1 | 9/2009 | Marshall et al. |
| 7,667,954 B2 | 2/2010 | Lessner et al. |
| 7,746,623 B2 | 6/2010 | Murakami et al. |
| 7,952,853 B2 | 5/2011 | Viste et al. |
| 8,223,473 B2 | 7/2012 | Dreissig et al. |
| 8,279,585 B2 | 10/2012 | Dreissig et al. |
| 8,339,769 B2 | 12/2012 | Schott et al. |
| 8,405,956 B2 | 3/2013 | Dreissig et al. |
| 8,675,348 B2 | 3/2014 | Viste et al. |
| 9,105,401 B2 | 8/2015 | Dreissig et al. |
| 11,387,047 B2 | 7/2022 | Petrzilek et al. |
| 11,482,382 B2 | 10/2022 | Shi et al. |
| 2004/0240152 A1 | 12/2004 | Schott et al. |
| 2004/0243183 A1 | 12/2004 | Norton et al. |
| 2006/0070492 A1 | 4/2006 | Qiu |
| 2006/0278842 A1* | 12/2006 | Wang .................... H01G 9/035 |
| | | 252/62.2 |
| 2007/0121276 A1* | 5/2007 | Uzawa .................... H01G 9/035 |
| | | 361/503 |
| 2008/0007894 A1 | 1/2008 | Seitz et al. |
| 2008/0013257 A1 | 1/2008 | Seitz et al. |
| 2008/0085451 A1 | 4/2008 | Freitag et al. |
| 2009/0035652 A1 | 2/2009 | Freitag et al. |
| 2010/0239916 A1 | 9/2010 | Bhattacharyya et al. |
| 2010/0289458 A1 | 11/2010 | Viste et al. |
| 2013/0141841 A1* | 6/2013 | Dreissig ................. H01G 9/028 |
| | | 29/25.41 |
| 2016/0028112 A1* | 1/2016 | Zhong .................... H01G 11/56 |
| | | 361/526 |
| 2019/0172654 A1* | 6/2019 | Weaver .................. H01G 9/035 |

FOREIGN PATENT DOCUMENTS

| | | | |
|---|---|---|---|
| EP | 1 538 642 A1 | 6/2005 | |
| EP | 2 416 331 A1 | 2/2012 | |
| GB | 2 447 724 A | 9/2008 | |
| JP | H 04364015 A | 12/1992 | |
| JP | 2011071238 A * | 4/2011 | |
| WO | WO-2020027124 A1 * | 2/2020 | ............ H01G 9/035 |

OTHER PUBLICATIONS

Abstract of Article—Rudge et al., "Conducting Polymers as Active Materials in Electrochemical Capacitors," Journal of Power Sources, vol. 47, Issues 1-2, Jan. 1, 1994, pp. 89-107.
Paper—Koenitzer et al. "Tantalum Flakes—Powders for High Reliability Electrolytic Capacitor Applications," 4 pages.
Paper—Lin et al., "Effect of Water Content in Ethylene Glycol as Electrolyte for Fabrication of Anodic Titania Nanotubes: Synchrotron XRD Characterization," 1 page.
International Search Report and Written Opinion for PCT/US2023/028960, dated Dec. 14, 2023, 13 pages.

* cited by examiner

WET ELECTROLYTIC CAPACITOR CONTAINING A GELLED WORKING ELECTROLYTE

RELATED APPLICATION

The present application is based upon and claims priority to U.S. Provisional Patent Application Ser. No. 63/401,261, having a filing date of Aug. 26, 2022, which is incorporated herein by reference.

BACKGROUND OF THE INVENTION

High voltage electrolytic capacitors are employed as energy storage reservoirs in many applications, including implantable medical devices. These capacitors are required to have a high energy density because it is desirable to minimize the overall size of the implanted device. This is particularly true of an implantable cardioverter defibrillator ("ICD"), also referred to as an implantable defibrillator, because the high voltage capacitors used to deliver the defibrillation pulse can occupy as much as one third of the ICD volume. Typically, metal foils (e.g., aluminum foil) are used in the electrolytic capacitor due to their small size. Because the electrostatic capacitance of the capacitor is proportional to its electrode area, the surface of the metallic foil may be, prior to the formation of the dielectric film, roughened or subjected to a chemical conversion to increase its effective area. The capacitance of the electrolytic capacitor is determined by the extent of roughing (the surface area) of the anode foil and the thickness and the dielectric constant of the oxide film.

Due to the limited surface area that may be provided by etching metallic foils, attempts have also been made to employ porous sintered pellets in wet electrolytic capacitors—i.e., "wet tantalum" capacitors. A tantalum pellet, for instance, may be formed by compressing a powder under high pressure and sintering at high temperature to form a sponge-like structure, which is very strong and dense but also highly porous. The porosity of the resulting tantalum pellet provides a large internal surface area. Despite its high surface area, however, tantalum pellets may still present high DCL and sensitivity of the capacitance to frequency, particularly at the high voltages often encountered in medical devices. Further attempts were made to utilize gelled electrolytes to overcome these problems. However, gelled electrolytes exhibited instability or degradation within the capacitor, as well as unpredictable gelation times. Namely, it has proven difficult to provide a gelled electrolyte capable of gelling in times necessary for production while maintaining good electrical properties, and without the use of external energy or catalyzation.

As such, a need currently exists for an improved wet electrolytic capacitor for use in implantable medical devices, such as defibrillators.

SUMMARY OF THE INVENTION

In accordance with one aspect of the present disclosure, a wet electrolytic capacitor is disclosed that contains an anode comprising an anodically oxidized pellet formed from a pressed and sintered powder, a cathode, and a working electrolyte in communication with the anode and the cathode. The working electrolyte is in the form of a gel and has a pH value of from about 5.0 to about 8.0. Moreover, the wet electrolytic capacitor exhibits a leakage current (DCL) of about 625 µA or less, as measured at a temperature of 37° C. at a rated voltage (e.g. 282 V in one example as discussed below).

In a further aspect of the present disclosure, a working electrolyte for a wet electrolytic capacitor is disclosed. The electrolyte includes from about 1 wt. % to about 40 wt. % of at least one ammonium salt of an organic acid, from about 0.01 wt. % to about 10 wt. % of at least one acid, from about 0.5 wt. % to about 20 wt. % of inorganic oxide particles, from about 0.01 wt. % to about 1 wt. % of a gelation activator, from about 30 wt. % to about 80 wt. % of water, and from about 5 wt. % to about 40 wt. % of at least one secondary solvent. The working electrolyte is in the form of a gel and has a pH value of from about 5.0 to about 8.0 and has a conductivity of from about 10 to about 100 milliSiemens per centimeter, determined at a temperature of 25° C.

In yet another aspect of the present disclosure, a method for forming a wet electrolytic capacitor is disclosed. The method includes forming a mixture that contains an ammonium salt of an organic acid, inorganic oxide particles, a gelation activator, an acid, and a solvent system that includes water; inducing gelation of the mixture so that it exhibits a first phase angle $\delta$ of from about 50° to 90°; placing the gelled mixture into communication with an anode, cathode, or both, where the anode is an anodically oxidized pellet formed from a pressed and sintered powder; and thereafter, allowing the mixture to further gel to form a working electrolyte that exhibits a second phase angle $\delta$ of from 0° to about 20°, where the second phase angle is exhibited by the working electrolyte in about 18 hours or less, and the working electrolyte further has a pH value of from about 5.0 to about 8.0.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
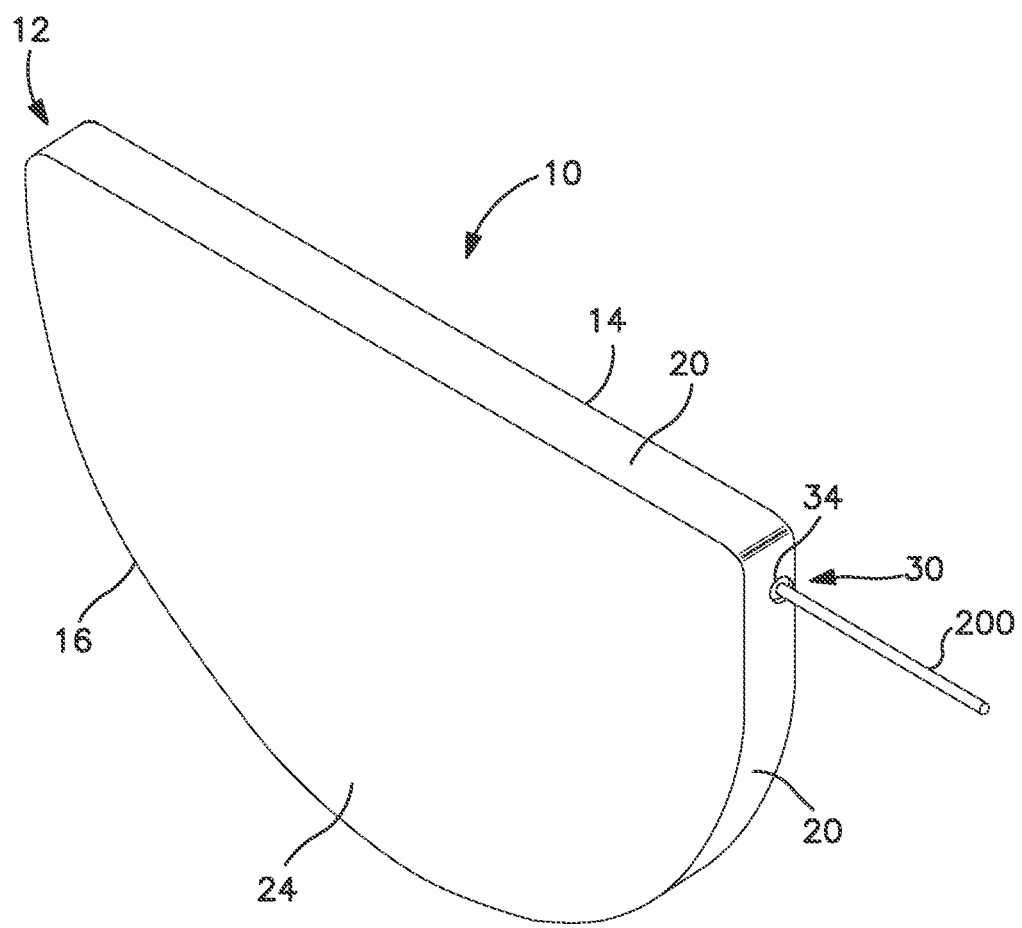
FIG. 1 is a perspective view of one embodiment of the wet electrolytic capacitor of the present invention.

Repeat use of reference characters in the present specification and drawings is intended to represent same or analogous features or elements of the invention.

Definitions

As used herein, the terms "about," "approximately," or "generally," when used to modify a value, indicates that the value can be raised or lowered by 10% and remain within the disclosed aspect, such as 7.5%, such as 5%, such as 4%, such as 3%, such as 2%, such as 1%, or any ranges or values therebetween. Moreover, the term "substantially free of" when used to describe the amount of substance in a material is not to be limited to entirely or completely free of and may correspond to a lack of any appreciable or detectable amount of the recited substance in the material. Thus, e.g., a material is "substantially free of" a substance when the amount of the substance in the material is less than the precision of an industry-accepted instrument or test for measuring the amount of the substance in the material. In certain example embodiments, a material may be "substantially free of" a substance when the amount of the substance in the material is less than 10%, less than 9%, less than 8%, less than 7%, less than 6%, less than 5%, less than 4%, less than 3%, less than 2%, less than 1%, less than 0.5%, or less than 0.1% by weight of the material.

DETAILED DESCRIPTION

It is to be understood by one of ordinary skill in the art that the present discussion is a description of exemplary aspects only, and is not intended as limiting the broader aspects of the present invention, which broader aspects are embodied in the exemplary construction.

The present disclosure is directed to a wet electrolytic capacitor that contains an anodically oxidized porous anode body, a cathode, and a working electrolyte that is the electrically active material that provides a connecting path between the anode and cathode. The working electrolyte has a neutral pH value and is in the form of a viscoelastic gel, which helps to chemically stabilize the electrolyte and improve the uniformity of wetting of the anode-cathode interface. Contrary to conventional wisdom, the capacitor of the present invention can be formed from such a gel and still achieve a relatively high capacitance and energy density without also exhibiting a high equivalent series resistance ("ESR") and/or DC leakage current ("DCL"). Without intending to be limited by theory, the present inventors believe that this unique combination of electrical properties can be achieved through selective control over various aspects of the working electrolyte. For example, the working electrolyte includes an ammonium salt of an organic acid, inorganic oxide particles, acid, a gelation activator, and aqueous solvent system. When employed in appropriate concentrations, the combination of these ingredients can result in an electrolyte that is gelled, but yet still has a high conductivity and a neutral pH value.

Namely, the present inventors have surprisingly found that by utilizing carefully controlled amounts of certain gelation activators, gelation times can be carefully crafted while maintaining excellent electrical properties. Without wishing to be bound by theory, the present inventors believe that even small amounts of specific gelation activators can initiate crosslinking and/or self-assembly between respective gelation activator particles as well as inorganic oxide particles contained in the working electrolyte, such that tailored amounts of gelation activator can be used in conjunction with the inorganic oxide particles to prepare working electrolytes with narrow gelation time ranges and excellent electrical properties, including high conductivities, and low leakage current. Surprisingly, the present inventors have found that gelation is initiated even when utilizing small amounts of the gelation activator without the need for strong acids, high temperatures, or controlled energy, normally required for gelation utilizing inorganic oxide particles.

For instance, in one aspect, the working electrolyte according to the present disclosure exhibits a gelation time (where specific viscosities and phase angles of gelation time, also referred to as the gelled phase angle, will be discussed in greater detail below) of about 80 hours or less, such as about 72 hours or less, such as about 60 hours or less, such as about 48 hours or less, such as about 36 hours or less, such as about 24 hours or less, such as about 22 hours or less, such as about 20 hours or less, such as about 18 hours or less, such as about 16 hours or less, such as about 14 hours or less, such as about 12 hours or less, such as about five minutes or more, such as about 15 minutes or more, such as about 30 minutes or more, such as about forty-five minutes or more, such as about 1 hour or more, such as about 2 hours or more, such as about 4 hours or more, such as about 6 hours or more, such as about 8 hours or more, or any values or ranges therebetween. For instance, in one aspect, gelation times can be tailored to be from between about 2 hours to about 20 hours, such as between about 4 hours to about 18 hours, such as between about 6 hours to about 12 hours, or any ranges or values therebetween. Namely, as noted above, by utilizing a gelation as described herein, a working electrolyte can be formed with highly specific gelation times, which can improve stability of the resulting capacitor, as well as improved impregnation of the anode and/or cathode, due at least in part to the improved processing predictability of the working electrolyte.

In addition, the above gelation times can be exhibited in the absence of high temperatures, such as curing at any one or more of the above times at room temperature (23° C.). However, in one aspect, elevated temperatures, can be used to further tailor gelation times according to the present disclosure. Thus, in one aspect, gelation according to any one or more of the above time periods or ranges can be conducted at a temperature of less than 100° C., such as about 90° C. or less, such as about 80° C. or less, such as about 70° C. or less, such as about 60° C. or less, such as about 50° C. or less, such as about 40° C. or less, such as about 30° C. or less, or any ranges or values therebetween. Of course, as noted above, in one aspect, gelation is conducted at room temperature in the absence of elevated temperatures.

Furthermore, the present inventors have found that the above gelation times can be tailored using even very small amounts of the gelation activator. In one aspect, the gelation activator is present in the working electrolyte in an amount of about 0.01 wt. % or greater, based upon the weight of the working electrolyte, such as about 0.02 wt. % or greater, such as about 0.03 wt. % or greater, such as about 0.04 wt. % or greater, such as about 0.05 wt. % or greater, such as about 0.06 wt. % or greater, such as about 0.07 wt. % or greater, such as about 0.08 wt. % or greater, such as about 0.09 wt. % or greater, such as about 0.1 wt. % or greater, such as about 0.2 wt. % or greater, such as about 0.25 wt. % or greater, such as up to about 2 wt. % or less, such as about 1.75 wt. % or less, such as about 1.5 wt. % or less, such as about 1.25 wt. % or less, such as about 1 wt. % or less, such as about 0.9 wt. % or less, such as about 0.8 wt. % or less, such as about 0.7 wt. % or less, such as about 0.6 wt. % or less, such as about 0.5 wt. % or less, or any ranges or values therebetween. For instance, in one aspect, the gelation activator is present in the working electrolyte in an amount from about 0.01 wt. % to about 2 wt. %, based upon the weigh to the working electrolyte, such as from about 0.05 wt. % to about 0.1 wt. %, or any ranges or values therebetween.

In addition, as noted above, it was found that capacitors formed according to the present disclosure maintain, or even improve, electrical properties as compared to capacitors that do not include a gelation activator while improving gelation times without external energy sources. For instance, the leakage current (DCL), which generally refers to the current flowing from one conductor to an adjacent conductor through an insulator, can be maintained at relatively low levels, such as about 650 µA or less, as measured at a temperature of 37° C. at a rated voltage, such as about 625

μA or less, such as about 600 μA or less, such as about 575 μA or less, such as about 550 μA or less, such as about 525 μA or less, such as about 500 μA or less, or any ranges or values therebetween. Leakage current may be measured using a leakage test meter (e.g., Keithley 2400 Series source meter) at a temperature of 37° C. and at a certain rated voltage (e.g. such as 282 V in one example as noted below) after a charging time of from about 60 to about 300 seconds. The equivalent series resistance ("ESR")—the extent that the capacitor acts like a resistor when charging and discharging in an electronic circuit—may also be about 15,000 milliohms or less, such as about 10,000 milliohms or less, such as about 5,000 milliohms or less, such as, from about 1 to about 4,500 milliohms, measured with a 2-volt bias and 1-volt signal at a frequency of 120 Hz.

Surprisingly, such ESR and leakage current values may even be maintained after aging for a substantial amount of time alone or in conjunction with high temperatures. Without wishing to be bound by theory, the present inventors have found that the gelled electrolyte as described herein is highly capable of preventing degradation, such as, by prevent voids that allow "bare spots" between the anode and cathode. Namely, such a gelled electrolyte provides a more reliable gelation of the gelled electrolyte, resulting in a more consistent and robust gel that can maintain excellent electrical properties even over a substantial period of use. For example, the leakage current and/or ESR values may be maintained for about 100 hours or more, in some embodiments from about 300 hours to about 2500 hours, and in some embodiments, from about 400 hours to about 1500 hours (e.g., 500 hours, 600 hours, 700 hours, 800 hours, 900 hours, 1000 hours, 1100 hours, or 1200 hours) at room temperature alone or even at temperatures ranging from about 100° C. to about 250° C., and, in some embodiments from about 100° C. to about 200° C. (e.g., 100° C., 125° C., 150° C., 175° C., or 200° C.).

The highly conductive, gelled electrolyte can also act in concert with the cathode system to achieve the desired electrical performance. Without intending to be limited by theory, the present inventors believe that charging of the capacitor to a high voltage (e.g., greater than the formation voltage) can enhance charge density. Nevertheless, because the conductive polymer is generally amorphous, it can dissipate and/or absorb the heat associated with the high voltage. Upon discharge, the conductive polymer likewise "relaxes" and allows ions in the electrolyte to move out of the polymer layer. Through such swelling and relaxation mechanism, charge density near the electrode can be increased without a chemical reaction with the electrolyte.

Various embodiments of the present invention will now be described in more detail.

1. Working Electrolyte

As noted above, the working electrolyte is in the form of a viscoelastic "gel", which is generally defined as a solid or semi-solid colloidal suspension that contains a continuous phase and a dispersed phase, where at least one of the phases is a solid and at least one of the phases is a liquid. For example, a hydrogel may be formed when the gelation activator and the inorganic oxide particles are crosslinked or self-assembled to form a continuous phase and the solvent contains water as a disperse phase that is entrapped within the crosslinked and/or self-assembled network. Regardless of its exact form, the viscoelastic gel within the capacitor is in the form of a semi-solid or solid so that it is not readily flowable at room temperature. This property can be represented by the viscoelastic phase angle δ, which is the degree to which the sinusoidal time variation in the stress is out of phase with the sinusoidal time variation in the shear rate. The phase angle δ for an ideal elastic solid is 0° (in phase) and the phase angle δ for an ideal viscous liquid is 90° (out of phase). In the present invention, the gelled electrolyte typically exhibits a phase angle θ of from 0° to about 20°, in some embodiments from 0.1° to about 5°, and in some embodiments, from about 0.2° to about 2°. Another parameter that can represent the viscoelastic behavior of the gel is the storage modulus, G', which is determined by dividing the "in-phase" component of the stress (representing solid-like behavior) by the maximum strain. Typically, the gelled electrolyte of the present invention exhibits a storage modulus of about 5 kilopascals ("kPa") or more, in some embodiments about 10 kPa or more, and in some embodiments from about 15 to about 50 kPa. The phase angle and storage modulus can be determined at room temperature (e.g., 25° C.) by dynamic oscillatory testing (e.g., frequency of 10 Hz and pressure of 5 Pa) with a rheometer having a cone plate configuration.

The conductivity of the working electrolyte is high and typically ranges from about 10 to about 100 milliSiemens per centimeter ("mS/cm"), in some embodiments from about 20 to about 90 mS/cm, in some embodiments from about 24 mS/cm to about 80 mS/cm, determined at a temperature of 25° C. using any known electric conductivity meter (e.g., Oakton Con Series 11). Within the ranges noted, the electric field is strong as the dielectric but can extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that is close to or even exceeds the formation voltage of the dielectric. The ratio of the voltage to which the capacitor can be charged to the formation voltage may, for instance, be from about 0.80 to about 2.00, and in some embodiments, from about 0.85 to about 1.50, and in some embodiments, from about 0.86 to about 1.20. As an example, the voltage to which the capacitor is charged may be from about 150 volts to about 500 volts, in some embodiments from about 180 volts to about 260 volts, and in some embodiments, from about 200 volts to about 240 volts. The formation voltage may likewise range from about from about 180 volts to about 320 volts, in some embodiments from about 200 volts to about 280 volts, and in some embodiments, from about 220 volts to about 250 volts. The working electrolyte is also neutral and thus has a pH value of from about 5.0 to about 8.0, in some embodiments from about 5.5 to about 7.5, and in some embodiments, from about 6.0 to about 7.0. Among other things, such a pH may enhance the ability of hydrogen ions present in an aqueous electrolyte to interact with the cathode material to achieve maximum capacitance and thus energy density.

To achieve the combination of high conductivity and a neutral pH value, the working electrolyte contains a combination of an ammonium salt, inorganic oxide particles, acid, gelation activator and solvent system in certain concentrations. The nature and concentration of these components are selectively controlled to help achieve the desired electrical properties for the capacitor. In this regard, various embodiments of the components of the electrolyte will now be described in greater detail below.

A. Gelation Activator

The gelation activator can be present in any of the amounts as discussed above. In one aspect, the gelation activator can be a self-assembling gelator, a crosslinking gelator, or a combination thereof. Namely, as noted above, suitable gelation activators should have sufficient activity to initiate crosslinking and/or self-assembly between the gelation activator as well as the inorganic oxide particles, while also being suitable for use in implantable medical devices. Therefore, as should be clear from the discussion herein, the gelation activator is a compound capable of initiating gelation absent external energy, and is differentiated from the inorganic oxide particles discussed herein.

For instance, in one aspect, as will be discussed in greater detail below, the crosslinking gelator may be selected to form a crosslinked network between respective gelation activator particles and/or inorganic oxide particles. Namely, cross-linkages between respective particles form a gel that entraps the liquid phase of the electrolyte. Similarly, the self-assembling gelator, such as an amphiphilic self-assembling gelator, can self-assemble such that hydrophobic and hydrophilic portions of the self-assembling gelator interact, trapping the liquid phase of the electrolyte, and forming a gel from the self-assembled structures. Furthermore, as noted above, it was surprisingly found that the self-assembling gelator and/or the cross-linking gelator can form a structure that includes inorganic oxide particles without sacrificing the gel structure, allowing a robust gel to be formed with very small amounts of gelator.

Thus, in one aspect, suitable gelation activators can include an ester of a fatty $C_1$-$C_{36}$ alkanoic acid and a sugar or derivative thereof, a vitamin or a derivative thereof, a glycerol or derivative thereof, or combinations thereof, an organometallic compound, or any combination thereof. Suitable organometallic compounds can have a general formula:

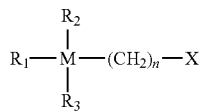

wherein,

M is an organometallic atom, such as silicon, titanium, and so forth, in one aspect, M is silicon;

$R_1$, $R_2$, and $R_3$ are independently an alkyl (e.g., methyl, ethyl, propyl, etc.) or a hydroxyalkyl (e.g., hydroxymethyl, hydroxyethyl, hydroxypropyl, etc.), where at least one of $R_1$, $R_2$, and $R_3$ is a hydroxyalkyl;

n is an integer from 0 to 8 in some embodiments from 1 to 6, and in some embodiments, from 2 to 4 (e.g., 3); and X is an organic or inorganic functional group, such as glycidyl, glycidyloxy, mercapto, amino, vinyl, etc.

In certain aspects, at least one of $R_1$, $R_2$, and $R_3$ in Formula (II) may be a hydroxyalkyl (e.g., $OCH_3$). For example, each of $R_1$, $R_2$, and $R_3$ may be a hydroxyalkyl. In other embodiments, however, $R_1$ may be an alkyl (e.g., $CH_3$) and $R_2$ and $R_3$ may a hydroxyalkyl (e.g., $OCH_3$).

In yet another aspect, X may be an amino group. Suitable aminofunctional organosilane compounds may include, for instance, monoamine functional silanes having the following general formula:

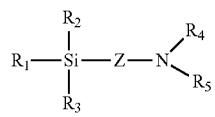

where, $R_1$, $R_2$, and $R_3$ are as defined above;

$R_4$ and $R_5$ are independently hydrogen, alkyl, independently alkyl, alkenyl, aryl, heteroaryl, cycloalkyl, heterocyclyl, halo, haloalkyl, hydroxyalkyl, or alternatively N, $R_4$, and $R_5$ together with one or more additional atoms form a ring structure (e.g., heteroaryl or heterocyclyl); and Z is an organic group that links the nitrogen atom to the silicon atom, such as alkyl (e.g., ethyl or propyl), aryl (e.g., phenyl), etc.

Examples of monoamino functional organosilane compounds may include, for instance, primary amine compounds (e.g., 3-aminopropyltriethoxysilane, 3-aminopropyltrimethoxysilane, 4-aminobutyltriethoxysilane, m-aminophenyltrimethoxysilane, p-aminophenyltrimethoxysilane, aminophenyltrimethoxysilane, 3-aminopropyltris(methoxy-ethoxy)silane, 11-aminoundecyltriethoxysilane, 2(4-pyridylethyl)triethoxysilane, 2-(trimethoxysilylethyl) pyridine, N-(3-trimethoxysilylpropyl) pyrrole, 3-(m-aminophenoxypropyltrimethoxysilane, aminopropylsilanetriol, 3-aminopropylmethyldiethoxysilane, 3-aminopropyldiisopropylethoxysilane, 3-aminopropyldimethylethoxysilane, etc.); secondary amine compounds (e.g., N-butylaminopropyltrimethoxy silane, N-ethylaminoisobutyltrimethoxysilane, n-methylaminopropyltrimethoxysilane, N-phenylaminopropyltrimethoxy silane, 3-(N-allylamino) propyltrimethoxysilane, cyclohexylaminomethyl) triethoxysilane, N-cyclohexylaminopropyltrimethoxysilane, N-ethylaminoisobutylmethyldiethoxysilane, (phenylaminoethyl)methyl-diethoxysilane, N-phenylaminomethytrimethoxysilane, N-methylaminopropylmethyl-dimethoxysilane, etc.); tertiary amine compounds (e.g., bis(2-hydroxyethyl) 3-aminopropyltriethoxysilane, diethylaminomethyltriethoxysilane, (N, N-diethyl-3-aminopropyl)trimethoxysilane, etc.); as well as combinations thereof.

Furthermore, alone, or in addition to an organometallic compound as discussed above, the gelation activator can be an ester of a fatty $C_1$-$C_{36}$ alkanoic acid and a sugar or derivative thereof, a vitamin or a derivative thereof, a glycerol or derivative thereof, or combinations thereof.

Namely, the fatty alkanoic acid can be a saturated or unsaturated fatty acid having an alkyl group containing from 1 to 36 carbons, such as from 1 to 22 to carbons in one aspect. Suitable fatty acids include caprylic acid, capric acid, lauric acid, myristic acid, palmitic acid, stearic acid, arachidic acid, behenic acid, lignoceric acid, cerotic acid, oleic acid, and mixtures thereof.

Further, suitable sugars or derivative thereof, vitamins or a derivative thereof, glycerols or derivative thereof include: sucrose, mannitol, sorbitol, erythritol, xylitol, lactitol, isomalt, maltitol, hydrogenated starch hydrolysates, arabitol, galactitol, glycerol, threitol, ribitol, fucitol, iditol, volemitol, derivatives thereof, and/or combinations thereof; water-soluble vitamins, such as ascorbic acid, or derivatives thereof, and mono, di, and tri glycerols, or combinations thereof. In one aspect, derivatives can include dehydration products of any one or more of the above, such as sorbitan derived from sorbitol. Nonetheless, regardless of the sugars or derivative thereof, vitamins or a derivative thereof, glycerols or derivative thereof selected, in one aspect, the sugars or derivative thereof, vitamins or a derivative thereof, glycerols or derivative thereof are selected so as to render the ester amphiphilic.

Nonetheless, as noted above, in one aspect, the self-assembling gelation activator includes an ester linkage, bonding the fatty acid and the sugar or derivative thereof, vitamin or a derivative thereof, glycerol or derivative thereof, or combinations thereof. Thus, in one aspect, suitable esters of a fatty $C_1$-$C_{36}$ alkanoic acid and a sugar or derivative thereof, a vitamin or a derivative thereof, a glycerol or derivative thereof, or combinations thereof can include an ascorbyl alkanoate, a sorbitan alkanoate, a triglycerol monoalkanoate, a sucrose alkanoate, or a combination thereof. For instance, in an aspect, suitable esters of a fatty $C_1$-$C_{36}$ alkanoic acid and a sugar or derivative thereof, a vitamin or a derivative thereof, a glycerol or derivative thereof, or combinations thereof can be ascorbyl palmitate, ascorbyl decanoate, ascorbyl laurate, ascorbyl caprylate, ascorbyl myristate, ascorbyl oleate, sorbitan monostearate, sorbitan laurate, sorbitan caprylate, sorbitan myristate, sorbitan oleate, glycerol palmitate, glycerol monodecanoate, glycerol monocaprylate, glycerol monostearate, glycerol monooleate, sucrose palmitate, sucrose monodecanoate, sucrose monostearate, sucrose laurate, sucrose caprylate, sucrose myristate, sucrose oleate, or a combination thereof.

B. Ammonium Salt

The organic acid used to form the ammonium salt may be "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acid may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, meso-tartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular type of salt employed, its solubility in the solvent system, and the presence of other components, ammonium salts are typically present in the electrolyte in an amount of from about 1 to about 40 wt. %, in some embodiments from about 2 to about 30 wt. %, in some embodiments from about 3 to about 25 wt. %, and in some embodiments, from about 4 to about 20 wt. %.

C. Acid

One or more acids are also employed to help achieve the desired pH and conductivity values. Suitable acids may include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, ethylenediaminetetraacetic acid ("EDTA"), glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. EDTA may be particularly suitable for use in the present invention as it not only can reduce the pH value of the electrolyte, but it can also serve as a sequestering agent for any metallic impurities that may be present in the particles. Regardless, as noted above, it should be clear that gelation of the working electrolyte discussed herein does not require the use of strong acids, large amounts of acid, and/or low pH to initiate gelation.

Although the total concentration of acids may vary, they are typically present in an amount of from about 0.01 wt. % to about 5 wt. %, in some embodiments from about 0.05 wt. % to about 4 wt. %, and in some embodiments, from about 0.1 wt. % to about 2 wt. % of the electrolyte. In one particular embodiment, a mixture of different acids may be employed, such as mixture of an inorganic and an organic acid. In such embodiments, inorganic acids (e.g., phosphoric acid) may constitute from about 0.005 wt. % to about 5 wt. %, in some embodiments from about 0.01 wt. % to about 3 wt. %, and in some embodiments, from about 0.05 wt. % to about 1 wt. % of the electrolyte, and organic acids (e.g., EDTA) may likewise constitute from about 0.005 wt. % to about 5 wt. %, in some embodiments from about 0.01 wt. % to about 3 wt. %, and in some embodiments, from about 0.05 wt. % to about 1 wt. % of the electrolyte.

D. Aqueous Solvent System

The electrolyte is aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such mixtures typically contain water in an amount from about 60 wt. % to about 95 wt. %, in some embodiments from about 65 wt. % to about 90 wt. %, and in some embodiments, from about 70 wt. % to about 87.5 wt. % of the solvent system and secondary solvents in an amount from about 5 wt. % to about 40 wt. %, in some embodiments from about 10 wt. % to about 35 wt. %, and in some embodiments, from about 12.5 wt. % to about 30 wt. % of the solvent system. Likewise, when such mixtures are employed, water typically constitutes from about 30 wt. % to about 80 wt. %, in some embodiments from about 35 wt. % to about 75 wt. %, and in some embodiments, from about 45 wt. % to about 65 wt. % of the electrolyte and secondary solvents may constitute from about 5 wt. % to about 40 wt. %, in some embodiments from about 10 wt. % to about 35 wt. %, and in some embodiments, from about 12.5 wt. % to about 30 wt. % of the electrolyte.

Namely, as noted above the present disclosure has found that by utilizing small amounts of gelation activator, lower amounts of secondary solvent may be used without impacting gelation of the gelation activator and inorganic oxide particles. It was surprisingly found that lower amounts of secondary solvent may also contribute to the excellent conductivity of the working electrolyte, which will be discussed in greater detail below.

E. Inorganic Oxide Particles

As indicated above, inorganic oxide particles are also employed in the electrolyte to form a gel having a certain desired viscosity. The amount of particles in the electrolyte may vary depending on the degree of gelation required, as well as the particular nature and concentration of other components in the electrolyte. Typically, however, inorganic oxide particles constitute from about 0.5 wt. % to about 15 wt. %, in some embodiments from about 1 wt. % to about 10 wt. %, and in some embodiments, from about 2.5 wt. % to about 5 wt. % of the electrolyte.

The particles may possess various forms, shapes, and sizes depending upon the desired result. For instance, the particles may be in the shape of a sphere, crystal, rod, disk, tube, string, etc. The average size of the particles may be less than about 1,000 nanometers, in some embodiments from about 1 to about 500 nanometers, in some embodiments from about 2 to about 200 nanometers, and in some embodiments, from about 4 to about 50 nanometers. As used herein, the average size of a particle refers to its average length, width, height, and/or diameter. The particles also typically have a high specific surface area, such as from about 50 square meters per gram ($m^2/g$) to about 1000 $m^2/g$, in some embodiments from about 100 $m^2/g$ to about 600 $m^2/g$, and in some embodiments, from about 150 $m^2/g$ to about 400 $m^2/g$. The term "specific surface area" generally refers to surface area as determined by the physical gas adsorption (B.E.T.) method of Bruanauer, Emmet, and Teller, Journal of American Chemical Society, Vol. 60, 1938, p. 309, with nitrogen as the adsorption gas. The test may be conducted with a MONOSORB® Specific Surface Area Analyzer available from QUANTACHROME Corporation, Syosset, NY, which measures the quantity of adsorbate nitrogen gas adsorbed on a solid surface by sensing the change in thermal conductivity of a flowing mixture of adsorbate and inert carrier gas (e.g., helium). In addition, the particles may also be relatively nonporous or solid. That is, the particles may have a pore volume that is less than about 0.5 milliliters per gram (ml/g), in some embodiments less than about 0.4 milliliters per gram, in some embodiments less than about 0.3 ml/g, and in some embodiments, from about 0.2 ml/g to about 0.3 ml/g. Without intending to be limited by theory, it is believed that particles having such a small size, high surface area, and solid nature may improve the gelation rate and enhance the uniformity and stability of the resulting suspension.

The inorganic oxide particles may be formed from a variety of materials, including, but not limited to, silica, alumina, zirconia, magnesium oxide, titanium dioxide, iron oxide, zinc oxide, copper oxide, etc., as well as combinations thereof. The particles may also be formed using a fumed process, precipitation, etc. Due to their higher surface area and smaller particle size, however, fumed particles are particularly suitable for use in the present invention. Fumed silica, for instance, is amorphous $SiO_2$ that can be produced by vapor phase hydrolysis of silicon tetrachloride in a hydrogen oxygen flame. Three-dimensional branched chain aggregates are produced in the flame from fusion of the primary particles. During cooling, these aggregates agglomerate into a fine powder having a particle size within the ranges noted above. Commercially suitable fumed silica particles may, for instance, include those available from Cabot Corporation under the designation CAB-O-SIL®.

For example, fumed silica possesses silanol groups that can react after initiation with the gelation activator to form a cross-linked network between respective inorganic oxide particles as well as cross-linking and/or self-assembling with the gelation initiator(s). In one example, by creating siloxane cross-linkages, such as, when an organometallic gelation activator, or by creating siloxane cross-linkages as well as a self-assembling phase, such as when the alkenoate is used, a gel is formed that entraps the liquid phase of the electrolyte.

F. Other Additives

The working electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizers normally constitute from about 0.01 wt. % to about 5 wt. %, in some embodiments from about 0.05 wt. % to about 2 wt. %, and in some embodiments, from about 0.1 wt. % to about 1 wt. % of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth.

The components of the electrolyte can be combined together in a variety of different ways, either before and/or after their incorporation into the capacitor. In one particular embodiment, the electrolyte may be gelled, or at least have begun the gelation process by combining the gelation activator with the ammonium slat of an organic acid, inorganic oxide particles, acid, and solvent system, before it is placed into contact with the anode and/or cathode.

Once gelled, the electrolyte can be incorporated into the capacitor in a variety of different ways. In one embodiment, for example, the electrolyte is simply added to the capacitor after the anode and cathode are positioned in the desired configuration. This may be accomplished, for instance, using a fill port. The anode may also be pre-impregnated with the gelled electrolyte, such as by dipping vacuum assisted impregnation, or other techniques, to improve impregnation of the anode into the electrolyte before it is placed into the capacitor. Impregnation of the anode with the gelled electrolyte can further enhance the degree of contact between the anode and the electrolyte. In either case, the present inventors have surprisingly discovered that the electrolyte can have a low initial viscosity and flowability so that it can be precisely incorporated into the capacitor. For example, the gel may have an initial viscosity (e.g., 1 hour or less after gelation is initiated or any of the time periods as discussed above in regards to gelation times, such as about 6 hours or more, in one example) within the range of from about 1 to about 40 centipoise, in some embodiments from about 2 to about 30 centipoise, and in some embodiments, from about 3 to about 10 centipoise, as determined using a Brookfield LVT viscometer (spindle #3 at 60 rpm) at a temperature of 25° C. Likewise, the gel may have an initial phase angle δ of from about 50° to 90°, in some embodiments from about 60° to 90°, and in some embodiments, from about 80° to 90°, as well as an initial storage modulus G' of about 1 kilopascal or less, in some embodiments about 0.1 kilopascals or less, and in some embodiments, from 0 to about 0.01 kilopascals.

After incorporation into the capacitor, however, the electrolyte may continue to gel until the viscosity is raised, such as to a viscosity, phase angle θ, and/or storage modulus G' within the target ranges noted above. This "semi-solid" or "solid" transition may occur relatively after gelation is induced, such as from about 2 to about 24 hours, in some embodiments from about 4 to about 18 hours, and in some embodiments, from about 6 to about 12 hours, or any of the ranges or values discussed above. The transition may also occur before and/or after the anode is incorporated into the capacitor and placed in contact with the cathode. If desired, an additional "fill" electrolyte may be added to ensure that good electrical contact exists between the impregnated anode and the cathode (e.g. if the anode is impregnated prior to incorporation into the capacitor element). This fill electrolyte may be formed in accordance with the present invention, or it may be formed from other known components.

II. Cathode

The cathode contains at least one substrate. In one aspect, the substrate can be coated with a conductive polymer. The substrate may include a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

The substrate may be roughened to increase its surface area and increase the degree to which the conductive polymer may be able to adhere thereto. In one embodiment, for example, the surface is chemically etched, such as by applying a solution of a corrosive substance (e.g., hydrochloric acid) to the surface. The surface may also be electrochemically etched, such as by applying a voltage to a solution of the corrosive substance so that it undergoes electrolysis. The voltage may be raised to a sufficiently high level to initiate "sparking" at the surface of the substrate, which is believed to create high local surface temperatures sufficient that etches away the substrate. This technique is described in more detail in U.S. Patent Application Publication No. 2010/0142124 to Dreissig, et al. In addition to chemical or electrochemical roughening techniques, mechanical roughening may also be employed. In one embodiment, for instance, the surface of the metal substrate may be abrasive blasted by propelling a stream of abrasive media (e.g., sand) against at least a portion of a surface thereof.

The conductive polymer coating may be formed from one or more layers. The material employed in such layer(s) may vary. Typically, the total thickness of the solid electrolyte is from about 1 to about 50 μm, and in some embodiments, from about 5 to about 20 μm. In one embodiment, for example, the material includes conductive polymer(s) that are can be an intrinsically conductive polymer having repeating units of the following formula (I):

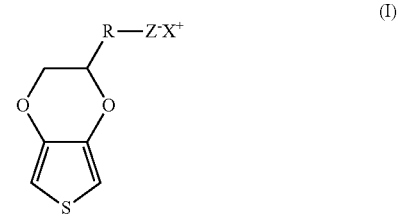

wherein,
R is $(CH_2)_a$—O—$(CH_2)_b$-L, where L is a bond or HC([CH$_2$]$_c$H);
a is from 0 to 10, in some embodiments from 0 to 6, and in some embodiments, from 1 to 4 (e.g., 1);
b is from 1 to 18, in some embodiments from 1 to 10, and in some embodiments, from 2 to 6 (e.g., 2, 3, 4, or 5);
c is from 0 to 10, in some embodiments from 0 to 6, and in some embodiments, from 1 to 4 (e.g., 1);
Z is an anion, such as $SO_3^-$, $C(O)O^-$, $BF_4^-$, $CF_3SO_3^-$, $SbF_6^-$, $N(SO_2CF_3)_2^-$, $C_4H_3O_4^-$, $ClO_4^-$, etc.;
X is a cation, such as hydrogen, an alkali metal (e.g., lithium, sodium, rubidium, cesium or potassium), ammonium, etc.

In one particular embodiment, Z in formula (I) is a sulfonate ion such that the intrinsically conductive polymer contains repeating units of the following formula (II):

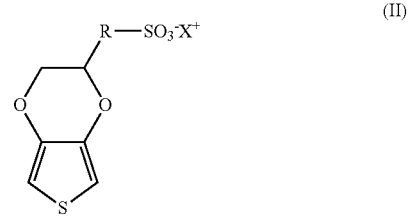

wherein, R and X are defined above. In formula (I) or (II), a is preferably 1 and b is preferably 3 or 4. Likewise, X is preferably sodium or potassium.

If desired, the polymer may be a copolymer that contains other types of repeating units. In such embodiments, the repeating units of formula (I) typically constitute about 50 mol. % or more, in some embodiments from about 75 mol.

% to about 99 mol. %, and in some embodiments, from about 85 mol. % to about 95 mol. % of the total amount of repeating units of formula (I) and/or (II) in the copolymer. Of course, the polymer may also be a homopolymer to the extent that it contains 100 mol. % of the repeating units of formula (I) and/or (II).

In another embodiment, the intrinsically conductive polymer has repeating thiophene units of the following general formula (III):

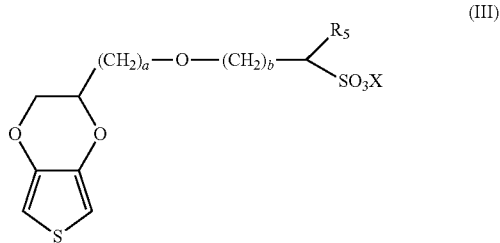

wherein, a and b are as defined above;

$R_5$ is an optionally substituted $C_1$-$C_6$ linear or branched alkyl group (e.g., methyl) or a halogen atom (e.g., fluorine);

X is a hydrogen atom, an alkali metal (e.g., Li, Na, or K), $NH(R_1)_3$, or $HNC_5H_5$, wherein $R_1$ is each independently a hydrogen atom or an optionally substituted $C_1$-$C_6$ alkyl group.

Specific examples of such homopolymers include poly(4-(2,3-dihydrothieno-[3,4-b][1,4]dioxin-2-ylmethoxy)-1-butane-sulphonic acid, salt) and poly(4-(2,3-dihydrothieno-[3,4-b][1,4]dioxin-2-ylmethoxy)–1-propanesulphonic acid, salt). Specific examples of thiophene compounds used to form such repeating units are described in U.S. Pat. No. 9,718,905 and may include, for instance, sodium 3-[(2,3-dihydrothieno[3,4-b][1,4]dioxin-2-yl)methoxy]-1-methyl-1-propanesulfonate, sodium 3-[(2,3-dihydrothieno[3,4-b]-[1,4]dioxin-2-yl)methoxy]-1-ethyl-1-propanesulfonate, sodium 3-[(2,3-dihydrothieno[3,4-b]-[1,4]dioxin-2-yl)methoxy]-1-propyl-1-propane-sulfonate, sodium 3-[(2,3-dihydrothieno[3,4-b]-[1,4]dioxin-2-yl)methoxy]-1-butyl-1-propanesulfonate, sodium 3-[(2,3-dihydrothieno[3,4-b]-[1,4]dioxin-2-yl)methoxy]-1-pentyl-1-propane-sulfonate, sodium 3-[(2,3-dihydrothieno[3,4-b]-[1,4]dioxin-2-yl)methoxy]-1-hexyl-1-propanesulfonate, sodium 3-[(2,3-dihydrothieno[3,4-b]-[1,4]dioxin-2-yl)methoxy]-1-isopropyl-1-propanesulfonate, sodium 3-[(2,3-dihydrothieno[3,4-b]-[1,4]dioxin-2-yl)methoxy]-1-isobutyl-1-propanesulfonate, sodium 3-[(2,3-dihydrothieno[3,4-b]-[1,4]dioxin-2-yl)methoxy]-1-isopentyl-1-propanesulfonate, sodium 3-[(2,3-dihydrothieno[3,4-b]-[1,4]dioxin-2-yl)methoxy]-1-fluoro-1-propanesulfonate, potassium 3-[(2,3-dihydrothieno[3,4-b]-[1,4]dioxin-2-yl)methoxy]-1-methyl-1-propanesulfonate, 3-[(2,3-dihydrothieno[3,4-b]-[1,4]dioxin-2-yl)methoxy]-1-methyl-1-propanesulfonic acid, ammonium 3-[(2,3-dihydrothieno[3,4-b]-[1,4]dioxin-2-yl)methoxy]-1-methyl-1-propane-sulfonate, triethylammonium 3-[(2,3-dihydrothieno[3,4-b]-[1,4]dioxin-2-yl)methoxy]-1-methyl-1-propanesulfonate, etc., as well as combination thereof. Each of the above exemplified thiophene monomers may be prepared from thieno[3,4-b]-1,4-dioxin-2-methanol and a branched sultone compound in accordance with a known method (e.g., Journal of Electroanalytical Chemistry, 443, 217 to 226 (1998)).

The intrinsically conductive polymer may be formed through a variety of techniques as would be understood by those skilled in the art. In one particular embodiment, for example, a 3,4-ethylenedioxythiophene salt may be polymerized in the presence of an oxidative catalyst. Derivatives of these monomers may also be employed that are, for example, dimers or trimers of the above compounds. The derivatives may be made up of identical or different monomer units and used in pure form and in a mixture with one another and/or with the monomers. Oxidized or reduced forms of these precursors may also be employed. The oxidative catalyst may be a transition metal salt, such as a salt of an inorganic or organic acid that contain ammonium, sodium, gold, iron(III), copper(II), chromium(VI), cerium (IV), manganese(IV), manganese(VII), or ruthenium(III) cations. Particularly suitable transition metal salts include halides (e.g., $FeCl_3$ or $HAuCl_4$); salts of other inorganic acids (e.g., $Fe(ClO_4)_3$, $Fe_2(SO_4)_3$, $(NH_4)_2S_2O_8$, or $Na_3Mo_{12}PO_{40}$); and salts of organic acids and inorganic acids comprising organic radicals. Examples of salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned salts may also be used.

Oxidative polymerization generally occurs in the presence of one or more solvents. Suitable solvents may include, for instance, water, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, isopropyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); phenolic compounds (e.g., toluene, xylene, etc.), and so forth. Water is a particularly suitable solvent for the reaction. The temperature at which the reaction occurs typically varies from about −20° C. to about 140° C., and in some embodiments, from about 20° C. to about 100° C. Upon completion of the reaction, known filtration techniques may be employed to remove any salt impurities.

Regardless of how it is formed, the polymer is considered "intrinsically" conductive to the extent that it has a positive charge located on the main chain that is at least partially compensated by anions covalently bound to the polymer. The polymer may, for example, have a relatively high specific conductivity, in the dry state, of about 1 Siemen per centimeter ("S/cm") or more, in some embodiments about 10 S/cm or more, in some embodiments about 20 S/cm or more, and in some embodiments, from about 50 to about 500 S/cm. As a result of its intrinsic conductivity, the solid electrolyte does not require the addition of conventional dopants, such as polystyrene sulfonic acid. In fact, the solid electrolyte may be substantially free of such dopants. Nevertheless, it should be understood that dopants may be employed in certain embodiments of the present invention. When utilized, however, dopants are typically present in the solid electrolyte in an amount of about 5 wt. % or less, in some embodiments about 2 wt. % or less, and in some embodiments, about 1 wt. % or less.

The polymer is also generally highly soluble in water, which enables it to be more easily and effectively applied to the anode. The soluble polymer is also able to more readily impregnate the small pores formed by the high specific charge powder, so that the resulting solid electrolyte has a "film-like" configuration and coats at least a portion of the anode in a substantially uniform manner. This improves the quality of the resulting oxide as well as its surface coverage, and thereby enhances the electrical properties of the capacitor assembly.

i. Inner Layers

The solid electrolyte is generally formed from one or more "inner" conductive polymer layers. The term "inner" in this context refers to one or more layers formed from the same material and that overly the substrate, whether directly or via another layer (e.g., adhesive layer). The inner layer(s), for example, typically contain an intrinsically conductive polymer such as described above. Through the use of such a polymer, the present inventors have discovered that the capacitor element can exhibit better performance at high voltages. In one particular embodiment, the inner layer(s) are generally free of extrinsically conductive polymers and thus formed primarily from intrinsically conductive polymers. More particularly, intrinsically conductive polymers may constitute about 50 wt. % or more, in some embodiments about 70 wt. % or more, and in some embodiments, about 90 wt. % or more (e.g., 100 wt. %) of the inner layer(s). One or multiple inner layers may be employed. For example, the solid electrolyte typically contains from 2 to 30, in some embodiments from 4 to 20, and in some embodiments, from about 5 to 15 inner layers (e.g., 10 layers). However, it should be understood that, in one aspect, the inner layer(s) can include extrinsically conductive polymers, or, in an aspect, be generally free of intrinsically conductive polymers.

Nonetheless, when the inner layer(s) include the intrinsically conductive polymer, the inner layer(s) may be applied in the form of a solution. The concentration of the polymer may vary depending on the desired viscosity of and the particular manner in which the layer is to be applied to the anode. Typically, however, the polymer constitutes from about 0.1 to about 10 wt. %, in some embodiments from about 0.4 to about 5 wt. %, and in some embodiments, from about 0.5 to about 4 wt. % of the solution. Solvent(s) may likewise constitute from about 90 wt. % to about 99.9 wt. %, in some embodiments from about 95 wt. % to about 99.6 wt. %, and in some embodiments, from about 96 wt. % to about 99.5 wt. % of the solution. While other solvents may certainly be employed, it is generally desired that water is the primary solvent such that the solution is considered an "aqueous" solution. In most embodiments, for example, water constitutes at least about 50 wt. %, in some embodiments at least about 75 wt. %, and in some embodiments, from about 90 wt. % to 100 wt. % of the solvent(s) employed. When employed, a solution may be applied to the anode using any known technique, such as dipping, casting (e.g., curtain coating, spin coating, etc.), printing (e.g., gravure printing, offset printing, screen printing, etc.), and so forth. The resulting conductive polymer layer may be dried and/or washed after it is applied to the anode.

ii. Outer Layers

The solid electrolyte may contain only "inner layers" and/or "outer layers" so that it is essentially formed from the same material. Nevertheless, in other embodiments, the solid electrolyte may also contain one or more "outer" conductive polymer layers that are formed from a different material than the inner layer(s) and overly the inner layer(s) and/or substrate (if no inner layer(s) are present). For example, the outer layer(s) may be formed from a dispersion of extrinsically conductive polymer particles. In one particular embodiment, the outer layer(s) are formed primarily from such extrinsically conductive polymer particles in that they constitute about 50 wt. % or more, in some embodiments about 70 wt. % or more, and in some embodiments, about 90 wt. % or more (e.g., 100 wt. %) of a respective outer layer. One or multiple outer layers may be employed. For example, the solid electrolyte may contain from 2 to 30, in some embodiments from 4 to 20, and in some embodiments, from about 5 to 15 outer layers, each of which may optionally be formed from a dispersion of the extrinsically conductive polymer particles.

When employed, the extrinsically conductive polymer may, for instance, have repeating units of the following formula (IV):

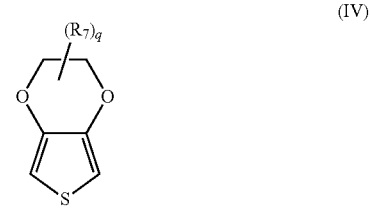

(IV)

wherein, $R_7$ is a linear or branched, $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); $C_5$ to $C_{12}$ cycloalkyl radical (e.g., cyclopentyl, cyclohexyl, cycloheptyl, cyclooctyl, cyclononyl, cyclodecyl, etc.); $C_6$ to $C_{14}$ aryl radical (e.g., phenyl, naphthyl, etc.); $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); $C_1$ to $C_4$ hydroxyalkyl radical, or hydroxyl radical; and q is an integer from 0 to 8, in some embodiments, from 0 to 2, and in one embodiment, 0. In one particular embodiment, "q" is 0 and the polymer is poly(3,4-ethylenedioxythiophene). One commercially suitable example of a monomer suitable for forming such a polymer is 3,4-ethylenedioxthiophene, which is available from Heraeus under the designation Clevios™ M.

The polymers of formula (III) are generally considered to be "extrinsically" conductive to the extent that they require the presence of a separate counterion that is not covalently bound to the polymer. The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

The extrinsically conductive particles typically have an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor element. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the ability to apply the layer to the anode. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

In addition to those mentioned above, still other ingredients may also be used in the dispersion. For example, conventional fillers may be used that have a size of from about 10 nanometers to about 100 micrometers, in some embodiments from about 50 nanometers to about 50 micrometers, and in some embodiments, from about 100 nanometers to about 30 micrometers. Examples of such fillers include calcium carbonate, silicates, silica, calcium or barium sulfate, aluminum hydroxide, glass fibers or bulbs, wood flour, cellulose powder carbon black, electrically conductive polymers, etc. The fillers may be introduced into the dispersion in powder form, but may also be present in another form, such as fibers.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), an alcohols (e.g., ethylene glycol, glycerol, di- or triethylene glycol).

The dispersion may be applied using a variety of known techniques, such as by spin coating, impregnation, pouring, dropwise application, injection, spraying, doctor blading, brushing, printing (e.g., ink-jet, screen, or pad printing), or dipping. The viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas.

Nonetheless, as noted above, as with the intrinsically conductive polymer, the thiophene monomers of the extrinsically conductive polymer may be chemically polymerized in the presence of an oxidative catalyst. The oxidative catalyst typically includes a transition metal cation, such as iron(III), copper(II), chromium(VI), cerium(IV), manganese (IV), manganese(VII), ruthenium(III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron(III) salts of aliphatic $C_1$ to $C_{20}$ carboxylic acids (e.g., 2-ethylhexylcarboxylic acid); iron(III) salts of aliphatic perfluorocarboxylic acids (e.g., trifluoroacetic acid or perfluorooctane acid); iron(III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron(III) salts of cycloalkane sulfonic acids (e.g., camphor sulfonic acid); and so forth. Mixtures of these above-mentioned iron(III) salts may also be used. Iron (III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

In a further aspect, the oxidative catalyst and monomer are applied, either sequentially or together, such that the polymerization reaction occurs in situ on the substrate. Suitable application techniques may include screen-printing, dipping, electrophoretic coating, and spraying, may be used to form a conductive polymer coating. As an example, the monomer may initially be mixed with the oxidative catalyst to form a precursor solution. Once the mixture is formed, it may be applied to the substrate and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The substrate may then be dried to remove the solvent therefrom. Thereafter, the substrate may be dipped into a solution containing the monomer. Polymerization is typically performed at temperatures of from about -10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers ("µm") to about 50 µm, in some embodiments from about 0.5 µm to about 20 µm, and in some embodiments, from about 1 µm to about 5 µm. It should be understood that the thickness of the coating is not necessarily the same at all locations on the substrate. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

III. Anode

The anode is typically formed from a valve metal composition. The specific charge of the composition may vary, such as from about 2,000 µF*V/g to about 80,000 µF*V/g, in some embodiments from about 5,000 µF*V/g to about 40,000 µF*V/g or more, and in some embodiments, from about 10,000 to about 20,000 µF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. The niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H. C. Starck (e.g., NH175 nodular powder). The valve metal composition may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). The precursor powder may initially contain particles in a granular form, which can then be deformed or flattened into a flake morphology using known techniques. One technique for reducing the thickness of the particles includes subjecting the powder to a mechanical milling process that grinds the particles into a smaller size. Any of a variety of milling techniques may be utilized in the present invention to achieve the desired particle characteristics. For example, the powder may be dispersed in a fluid medium (e.g., ethanol, methanol, fluorinated fluid, etc.) to form a slurry. The slurry may then be combined with a grinding media (e.g., metal balls, such as tantalum) in a mill. The number of grinding media may generally vary depending on the size of the mill, such as from about 100 to about 2000, and in some embodiments from about 600 to about 1000. The starting powder, the fluid medium, and grinding media may be combined in any proportion. For example, the ratio of the starting valve metal powder to the grinding media may be from about 1:5 to about 1:50. Likewise, the ratio of the volume of the fluid medium to the combined volume of the starting valve metal powder may be from about 0.5:1 to about 3:1, in some embodiments from about 0.5:1 to about 2:1, and in some embodiments, from about 0.5:1 to about 1:1. Some examples of mills that may be used in the present invention are described in U.S. Pat. Nos. 5,522,558; 5,232,169; 6,126,097; and 6,145,765.

Milling may occur for any predetermined amount of time needed to achieve the target specific surface area. For example, the milling time may range from about 30 minutes to about 40 hours, in some embodiments, from about 1 hour to about 20 hours, and in some embodiments, from about 5 hours to about 15 hours. Milling may be conducted at any desired temperature, including at room temperature or an elevated temperature. After milling, the fluid medium may be separated or removed from the powder, such as by air-drying, heating, filtering, evaporating, etc. For instance, the powder may optionally be subjected to one or more acid leaching steps to remove metallic impurities. Such acid leaching steps are well known in the art and may employ any of a variety of acids, such as mineral acids (e.g., hydrochloric acid, hydrobromic acid, hydrofluoric acid, phosphoric acid, sulfuric acid, nitric acid, etc.), organic acids (e.g., citric acid, tartaric acid, formic acid, oxalic acid, benzoic acid, malonic acid, succinic acid, adipic acid, phthalic acid, etc.); and so forth.

Although not required, the powder may be agglomerated using any technique known in the art. Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the particles may be passivated by the gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

Regardless of the particular method employed, the resulting powder may possess certain characteristics that enhance its ability to be formed into a capacitor anode. For example, the particles employed in the anode may be generally flat. The degree of flatness is generally defined by the "aspect ratio", i.e., the average diameter or width of the particles divided by the average thickness ("D/T"). For example, the aspect ratio of the particles may be from about 2 to about 100, in some embodiments from about 3 to about 50, in some embodiments, from about 4 to about 30. The particles may also have a specific surface area of from about 0.5 to about 10.0 $m^2/g$, in some embodiments from about 0.7 to about 5.0 $m^2/g$, and in some embodiments, from about 1.0 to about 4.0 $m^2/g$. The term "specific surface area" is defined in more detail above. The bulk density (also known as Scott density) is also typically from about 0.1 to about 2 grams per cubic centimeter ($g/cm^3$), in some embodiments from about 0.2 $g/cm^3$ to about 1.5 $g/cm^3$, and in some embodiments, from about 0.4 $g/cm^3$ to about 1 $g/cm^3$. "Bulk density" may be determined using a flow meter funnel and density cup. More specifically, the sample may be poured through the funnel into the cup until the sample completely fills and overflows the periphery of the cup, and thereafter sample may be leveled-off by a spatula, without jarring, so that it is flush with the top of the cup. The leveled sample is transferred to a balance and weighed to the nearest 0.1 gram to determine the density value. Such an apparatus is commercially available from Alcan Aluminum Corp. of Elizabeth, New Jersey. The particles may also have an average size (e.g., width) of from about 0.1 to about 100 micrometers, in some embodiments from about 0.5 to about 70 micrometers, and in some embodiments, from about 1 to about 50 micrometers.

To facilitate the construction of the anode, certain additional components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrollidone); cellulosic polymers, such as carboxymethylcellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead wire. The wire may be formed from any electrically conductive material, such as tantalum, niobium, aluminum, hafnium, titanium, etc., as well as electrically conductive oxides and/or nitrides of thereof.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al. Thereafter, the pellet is sintered to form a porous, integral mass. The present inventors have discovered that certain sintering conditions can result in an increase in the specific charge of the resulting anode, as well increase in the breakdown voltage of the resulting capacitor. More particularly, the pellet is typically sintered at a temperature of from about 800° C. to about 2000° C., in some embodiments from about 1200° C. to about 1800° C., and in some embodiments, from about 1500° C. to about 1700° C., for a time of from about 5 minutes to about 100 minutes, and in some embodiments, from about 8 minutes to about 15 minutes. This may occur in one or more steps. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed. When employed, flake particles may be better able to withstand the high sintering temperatures and prolonged sintering times often employed in forming the anode, and produce a porous sintered body with low shrinkage and a large specific surface area.

Upon sintering, the pellet shrinks due to the growth of metallurgical bonds between the particles. Because shrinkage generally increases the density of the pellet, lower press densities ("green") may be employed to still achieve the desired target density. For example, the target density of the pellet after sintering is typically from about 5 to about 8 grams per cubic centimeter. As a result of the shrinking phenomenon, however, the pellet need not be pressed to such high densities, but may instead be pressed to densities of less than about 6.0 grams per cubic centimeter, and in some embodiments, from about 4.5 to about 5.5 grams per cubic centimeter. Among other things, the ability to employ lower green densities may provide significant cost savings and increase processing efficiency. It should be understood that the pressed density may not always be uniform across the pellet, particularly if compression occurs in a direction perpendicular to the longitudinal axis of the wire. Namely, the pressed density is determined by dividing the amount of material by the volume of the pressed pellet. The volume of the pellet is directly proportional to the compressed length in the direction perpendicular to the longitudinal axis of the wire. The density is inversely proportional to the compressed length. Thus, the compressed length is actually lower at those locations adjacent to the wire than the remaining locations of the pellet. The pressed density is likewise greater at those locations adjacent to the wire. For example, the density of the pellet at those locations adjacent to the wire is typically at least about 10% greater, and in some cases, at least about 20% greater than the pressed density of the pellet at the remaining locations of the pellet.

Figure 2:
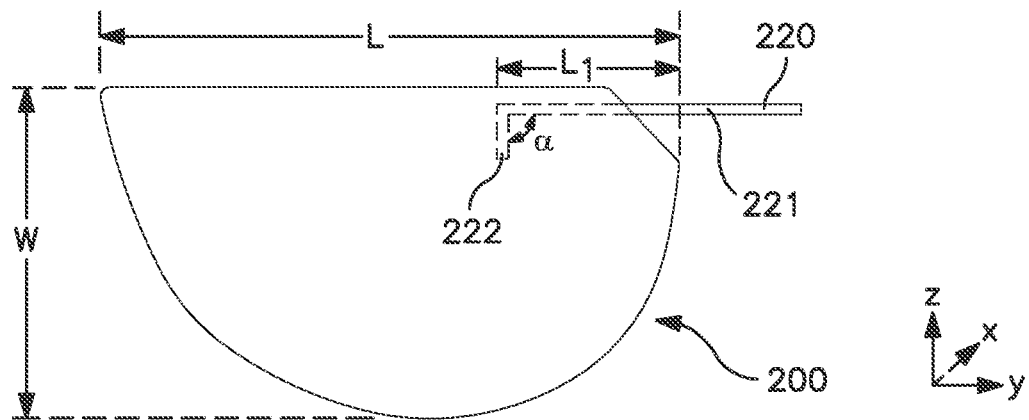
FIG. 2 is a top view of embodiment of an anode that may be employed in the capacitor of the present invention.
Figure 3:
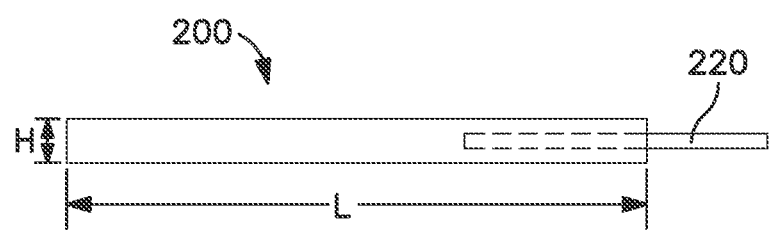
FIG. 3 is a frontal view of the anode of FIG. 2.

Due to the thin nature of the planar anode, it is sometimes desirable to control the manner in which the anode wire is inserted to limit the extent that stresses applied during manufacturing will cause the wire to pull out of the anode. For example, in one embodiment, at least a portion of the wire within the anode is bent at an angle relative to the longitudinal axis of the wire. This "bend" reduces the ease to which the wire can be pulled out in the longitudinal direction after the anode is pressed and sintered. Referring to FIGS. 2-3, for example, one embodiment of a planar anode 200 is shown that contains an anode wire 220. The anode wire contains a first portion 221 that extends in a longitudinal direction ("y" direction) from the anode 200. Within the body of the anode, the wire 200 also contains a second portion 222 that is bent at an angle "a" relative to the first portion 221. The angle "a" is typically from about 40° to about 120°, in some embodiments from about 60° to about 110°, and in some embodiments, from about 80° to about 100° (e.g., about) 90°. Such a bent configuration may be achieved in a variety of different ways. For example, in one embodiment, a press mold may be partially filled with the powder, and then a "pre-bent" anode wire may be inserted into the press mold. Thereafter, the mold may be filled with powder and the entire assembly compressed into a pellet.

In addition to its geometric configuration, the extent to which the anode wire is inserted into the anode may also be controlled to help minimize the likelihood of withdrawal during manufacturing. That is, the wire is less likely to be pulled out of the anode the farther it is inserted. Of course, too great of a wire insertion can alter the uniformity of the press density, which can impact the resulting electrical performance of the anode. In this regard, the present inventors have discovered that the ratio of the length of the anode in which the wire is inserted to the entire length of the anode is typically from about 0.1 to about 0.6, and in some embodiments, from about 0.2 to about 0.5. In FIG. 2, for example, the length "$L_1$" represents the length of the anode 200 in which the anode wire 220 is inserted, while the length "L" represents the entire length of the anode 200. In certain cases, the length "L" of the anode 200 may range from about 1 to about 80 millimeters, in some embodiments from about 10 to about 60 millimeters, and in some embodiments, from about 20 to about 50 millimeters. Likewise, the length "$L_1$" may be from about 1 to about 40 millimeters, in some embodiments, from about 2 to about 20 millimeters, and in some embodiments, from about 5 to about 15 millimeters. The width "W" of the anode may also be from about 0.05 to about 40 millimeters, in some embodiments, from about 0.5 to about 25 millimeters, and in some embodiments, from about 2 to about 10 millimeters.

The thickness of the anode is generally small to improve the electrical performance and volumetric efficiency of the resulting capacitor. In FIG. 3, for example, the thickness of a planar anode 200 is represented by the dimension "H." Typically, the thickness of the anode is about 5 millimeters or less, in some embodiments, from about 0.05 to about 4 millimeters, and in some embodiments, from about 0.1 to about 3.5 millimeters. The ratio of the length of the anode to the thickness of the anode is from about 5 to about 50, in some embodiments from about 6 to about 30, and in some embodiments, from about 7 to about 20. Although shown as a "D-shape" in FIG. 2, it should also be understood that the anode may possess any other desired shape, such as square, rectangle, circle, oval, triangle, etc. Polygonal shapes having more than four (4) edges (e.g., hexagon, octagon, heptagon, pentagon, etc.) are particularly desired due to their relatively high surface area.

The anode also contains a dielectric formed by anodically oxidizing ("anodizing") the sintered anode so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. Aqueous solvents (e.g., water) and/or non-aqueous solvents (e.g., ethylene glycol) may be employed. To enhance conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The temperature of the anodizing solution may range from about 10° C. to about 200° C., in some embodiments from about 20° C. to about 150° C., and in some embodiments, from about 30° C. to about 100° C. The resulting dielectric layer may be formed on a surface of the anode and within its pores. When employed, the specific nature of the powder may allow the resulting anode to achieve a high specific charge even at the high formation voltages often employed in the present invention. For example, within the ranges noted above, the anode may still be able to a specific charge of from about 2,000 µF*V/g to about 20,000 µF*V/g, in some embodiments from about 5,000 µF*V/g to about 15,000 µF*V/g or more, and in some embodiments, from about 8,000 to about 12,000 µF*V/g.

Figure 4:
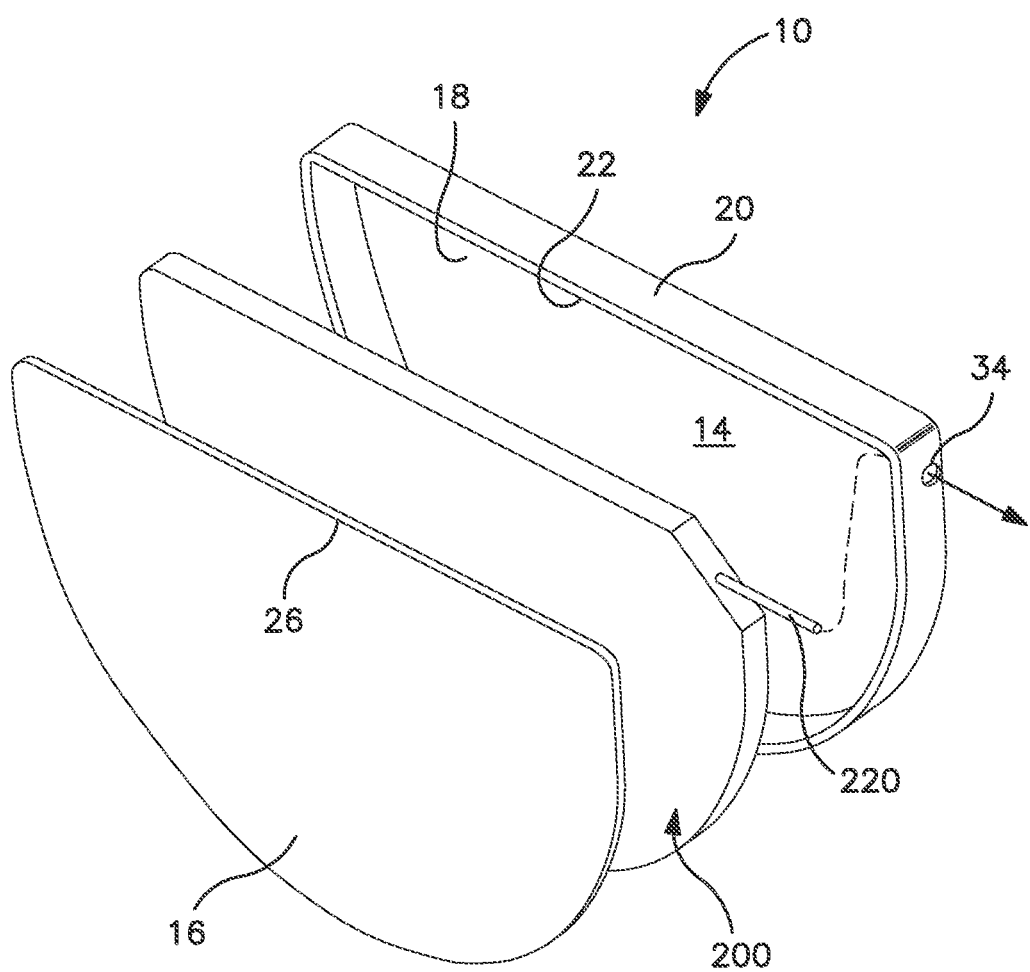
FIG. 4 is a perspective view illustrating the assembly of the anode of FIG. 2 with casing components to form the capacitor shown in FIG. 1.

The particular manner in which the components are incorporated into the capacitor is not critical and may be accomplished using a variety of techniques. In most embodiments, however, the anode is positioned within a casing. Referring to FIGS. 1 and 4, for example, one embodiment of a capacitor 10 is shown that includes the anode 200 shown in FIGS. 2-3. Although only one anode is shown, it should be understood that multiple anodes (e.g., stack) may be employed as is described, for instance, in U.S. Pat. No. 7,483,260 to Ziarniak, et al. In the illustrated embodiment, the anode 200 may be positioned within a casing 12 made of a first casing member 14 and a second casing member 16. The first casing member 14 has a sidewall 18 joined to a surrounding sidewall 20 extending to an edge 22. The second casing member 16 is in the shape of a plate and contains a second face wall 24 having a surrounding edge 26. The casing members 14 and 16 may be hermetically sealed together by welding (e.g., laser welding) the overlapping edges 22 and 26 where the contact each other. The casing members 14 and/or 16 may be analogous to the metal substrate described above such that a conductive polymer coating (not shown) may be deposited on the interior surface thereof. Alternatively, a separate metal substrate may be located adjacent to the casing member 14 and/or 16 and applied with the conductive polymer coating.

Although not shown, one or more separators may be employed that help insulate the anode and conductive polymer-coated cathode from each other. Examples of suitable materials for this purpose include, for instance, porous polymer materials (e.g., polypropylene, polyethylene, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes.

In addition, while not shown, it should be understood that a capacitor according to the present disclosure may contain more than one anode, such as a multi-anode structure. Thus, although only one anode is shown, it should be understood that multiple anodes (e.g., stack) may be employed as is described, for instance, in U.S. Pat. No. 7,483,260 to Ziarniak, et al., or multiple anodes may be deployed with non-similar cross-sections, that combine to form the cross-section of the respective casing, such as described, for instance, in U.S. Pat. No. 9,870,868 to Laforge, et. al.

A feedthrough 30 may also be employed that electrically insulates the anode wire 200 from the casing 12. The feedthrough 30 extends from within the casing 12 to the outside thereof. A hole 34 may be provided in the surrounding sidewall 20 of the casing member 14 into which the feedthrough 30. The feedthrough 30 may, for example, be a glass-to-metal seal ("GTMS") that contains a ferrule (not shown) with an internal cylindrical bore of a constant inside diameter. An insulative glass can thus provide a hermetic seal between the bore and the anode wire 200 passing therethrough. After assembly and sealing (e.g., welding), the electrolyte may optionally be introduced into the casing through a fill-port. Filling may be accomplished by placing the capacitor in a vacuum chamber so that the fill-port extends into a reservoir of the electrolyte. When the chamber is evacuated, pressure is reduced inside the capacitor. When the vacuum is released, pressure inside the capacitor re-equilibrates, and the electrolyte is drawn through the fill-port into the capacitor.

Regardless of its particular configuration, the capacitor of the present invention may exhibit excellent electrical properties. For example, the capacitor may exhibit a high volumetric efficiency, such as from about 50,000 µF*V/cm³ to about 300,000 µF*V/cm³, in some embodiments from about 60,000 µF*V/cm³ to about 200,000 µF*V/cm³, and in some embodiments, from about 80,000 µF*V/cm³ to about 150,000 µF*V/cm³, determined at a frequency of 120 Hz and at room temperature (e.g., 25° C.). Volumetric efficiency is determined by multiplying the formation voltage of a part by its capacitance, and then dividing by the product by the volume of the part. For example, a formation voltage may be 175 volts for a part having a capacitance of 520 µF, which results in a product of 91,000 µF*V. If the part occupies a volume of about 0.8 cm³, this results in a volumetric efficiency of about 113,750 µF*V/cm³.

The capacitor may also exhibit a high energy density that enables it suitable for use in high pulse applications. Energy density is generally determined according to the equation $E=1/2*CV^2$, where C is the capacitance in farads (F) and V is the working voltage of capacitor in volts (V). The capacitance may, for instance, be measured using a capacitance meter (e.g., Keithley 3330 Precision LCZ meter with Kelvin Leads, 2 volts bias and 1 volt signal) at operating frequencies of from 10 to 120 Hz (e.g., 120 Hz) and a temperature of 25° C. For example, the capacitor may exhibit an energy density of about 2.0 joules per cubic centimeter ($J/cm^3$) or more, in some embodiments about 3.0 $J/cm^3$, in some embodiments from about 3.5 $J/cm^3$ to about 10.0 $J/cm^3$, and in some embodiments, from about 4.0 to about 8.0 $J/cm^3$. The capacitance may likewise be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$. The capacitor may also exhibit a relatively high "breakdown voltage" ("BDV" voltage at which the capacitor fails), such as about 180 volts or more, in some embodiments about 200 volts or more, such as about 250 volts or more, such as about 300 volts or more, such as about 350 volts or more, such as about 375 volts or more, or any ranges or values therebetween, such as, in one aspect, from about 350 to about 425 volts.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 volts and approximately 850 volts, or, desirably, between approximately 600 Volts and approximately 900 volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device may also contain a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following example.

Example 1

Electrolyte solutions for forming a working electrolyte for use in the capacitor of the present invention were prepared according to the following:

| Electrolyte Solutions | | | |
|---|---|---|---|
| | | | Wt. (g) % |
| A. Electrolyte | Water | | 62.44 |
| | Ethylene glycol | | 12.5 |
| | Ammonium Adipate | | 5.9 |
| | 3-methyl-4-nitrobenzoic acid | | 0.31 |
| | 85 wt. % $H_3PO_4$ | | 0.15 |
| Total Electrolyte | | | 81.3 |
| B. Additive | Ethylene glycol | | 82 |
| | $SiO_2$ | | 18 |
| Total Additive | | | 100 |

The Electrolyte (A) and Additive (B) were formed into working electrolytes according to Table 1. As illustrated, Samples 1 and 2 each contained a gelation activator as described herein. Conductivity was measured at room temperature (22° C. to 25° C.).

TABLE 1

| | Sample 1 | Sample 2 |
|---|---|---|
| A. Electrolyte (wt. %) | 81.27 | 81.29 |
| B. Additive(wt. %) | 18.69 | 18.7 |
| Sorbitan Monostearate (wt. %) | 0.4 | 0 |
| 3-aminopropyl trimethoxysilane (wt. %) | 0 | 0.01 |
| pH | 6.63 | 6.55 |
| Conductivity (mS/cm) | 24.05 | 24.01 |
| BDV | 375 | 403 |

To form the working electrolytes, the components of part A were initially combined and sonicated to mix the materials. The components of part B were also combined and mixed, and then combined with the respective gelation activator, and ultra sonicated to mix the materials. After mixing, parts A and B were combined and tested as illustrated in Table 1. In addition, the additive and gelation activators were tested for gelation properties according to Tables 2 and 3, where each sample maintained parts A and B as discussed above, and only amounts of gelation activator were varied. For each of the samples conducted herein, SMS samples were gelled at 37° C., APTMS samples were gelled at room temperature, and all property testing was conducted at room temperature (22° C. to 25° C.).

TABLE 2

| | Amount (wt. %) | Gelation | Time if Gelled |
|---|---|---|---|
| Sorbitan Monostearate | 0 | no | n/a |
| | 0.2 | no | n/a |
| | 0.4 | yes-strong | 16-18 hrs. |
| | 0.6 | yes-strong | 16-18 hrs. |
| | 0.8 | yes-strong | 16-18 hrs. |
| | 1 | yes-strong | 16-18 hrs. |

TABLE 3

| | Amount (wt. %) | Gelation | Time if Gelled |
|---|---|---|---|
| 3-aminopropyl trimethoxysilane | 0.01 | yes-strong | 16-18 hours |
| | 0.05 | yes-strong | 3 hours |
| | 0.1 | yes-strong | 1 hour |
| | 0.15 | yes-strong | 30 minutes |

TABLE 3-continued

| Amount (wt. %) | Gelation | Time if Gelled |
|---|---|---|
| 0.2 | yes-strong | 15 minutes |
| 0.25 | yes-strong | 5 minutes |

As illustrated, the gelation activators according to the present disclosure initiate gelation at low concentrations and can be varied to tailor the time to gelation. In addition, as illustrated in Table 2, fumed silica alone (0 wt. % SMS, as a control for both Tables 2 and 3), did not initiate gelation according to the process of the present examples.

Example 2

Open cell capacitors were prepared from the electrolytes of Example 1 as follows. A leaded anode was placed in a plastic vial and working electrolytes as discussed in Example 1 were added to the vial to just cover the anode within an hour of forming the electrolyte. Vials containing anodes, cathodes, and electrolyte were placed in a vacuum chamber and evacuated to approximately 30 inches of Hg for 2-4 hours infiltrate the porous anode with electrolyte.

The test cells were assembled as follows: rectangular pieces of cellulose separator, (e.g., PXW7D from Nippon Kodoshi Corporation) that were approximately 10% larger (length and width) than the cathode foils were pressed into place on the electrolyte-coated cathode such that the separator extended past all four edges of the cathode foil and then trimmed to the size of the cathode, and the previously infiltrated anode was sandwiched between the two separator-cathode foils. The entire assemblage of cathode-separator-anode-separator-cathode was filled with working electrolyte, lightly held together and placed back in vacuum for 30 minutes to remove entrapped air. Each of the following samples were prepared from the same master batch of working electrolyte and prepared into individual capacitor elements according to the above process.

Capacitor cells were tested for capacitance and equivalent series resistance (ESR) from 40-10,000 Hz using commercially available instrumentation (e.g., Agilent 4294A Precision Impedance Analyzer) and subjected to a series of charge-discharge cycles using different load resistors to evaluate the energy capacity of the device. Specifically, the open cell capacitors were charged to a predetermined voltage at currents of 5-10 milliamps using a Keithley 2400 Sourcemeter and then discharged into load resistors of 10,000 ohms or 50 ohms. The discharge voltage across the resistor versus time was recorded using a Tektronix 784A oscilloscope. Cumulative energy was calculated from the measured discharge voltage by integrating the voltage squared divided by load resistance with respect to time. Additionally, capacitors cells were charged to predetermined voltage and then held at voltage for up to 300 seconds while monitoring voltage across a 1,000 ohm series resistor, i.e., leakage current. The results are set forth below in Tables 4 and 5.

TABLE 4

| | Sample 1-1 | Sample 1-2 |
|---|---|---|
| Capacitance (µF) | 567 | 578 |
| ESR (ohms) | 1.07 | 1.09 |
| DCL (µA) | 483 | 502 |
| Energy delivered (Joules) | 20.65 | 21.08 |

TABLE 5

| | Sample 2-1 | Sample 2-2 | Sample 2-3 | Sample 2-4 |
|---|---|---|---|---|
| Capacitance (uF) | 578.1 | 577.0 | 578.3 | 578.2 |
| ESR (ohms) | 1.26 | 1.31 | 1.34 | 1.24 |
| DCL (µA) | 677 | 542 | 529 | 960 |
| Energy delivered (Joules) | 21.05 | 21.11 | 21.08 | 21.19 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   an anode comprising an anodically oxidized pellet formed from a pressed and sintered powder;
   a cathode; and
   a working electrolyte in communication with the anode and the cathode, wherein the working electrolyte is in the form of a gel and has a pH value of from about 5.0 to about 8.0, further wherein the working electrolyte comprises a gelation activator in an amount of about 0.01 wt. % to about 2 wt. % based upon the weight of the working electrolyte; and
   wherein the wet electrolytic capacitor exhibits a leakage current (DCL) of about 625 uA or less, as measured at a temperature of 37° C. at a rated voltage.

2. The wet electrolytic capacitor of claim 1, wherein the working electrolyte comprises an ammonium salt of an organic acid, inorganic oxide particles, an acid, and a solvent system that comprises water.

3. The wet electrolytic capacitor of claim 2, wherein the gelation activator is present in the working electrolyte in an amount of about 0.05 wt. % to about 0.1 wt. %; based upon the weight of the working electrolyte.

4. The wet electrolytic capacitor of claim 2, wherein the solvent system further includes a secondary solvent.

5. The wet electrolytic capacitor of claim 4, wherein the secondary solvent is ethylene glycol, wherein the ethylene glycol is present in the working electrolyte.

6. The wet electrolytic capacitor of claim 4, wherein water constitutes from about 35 wt. % to about 85 wt. % of the electrolyte and ethylene glycol constitute from about 25 wt. % or less of the working electrolyte.

7. The wet electrolytic capacitor of claim 1, wherein the gelation activator is a self-assembling gelator, a crosslinking gelator, or a combination thereof.

8. The wet electrolytic capacitor of claim 1, wherein the gelation activator comprises an ester of a fatty $C_1$-$C_{36}$ alkanoic acid and a sugar or derivative thereof, a vitamin or a derivative thereof, a glycerol or derivative thereof, or combinations thereof, an organometallic compound, or any combination thereof.

9. The wet electrolytic capacitor of claim 8, wherein the organometallic compound has the following general formula:

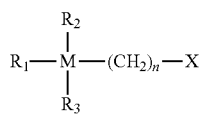

wherein,

M is an organometallic atom;

$R_1$, $R_2$, and $R_5$ are independently an alkyl or a hydroxyalkyl, wherein at least one of $R_1$, $R_2$, and $R_3$ is a hydroxyalkyl;

n is an integer from 0 to 8;

X is an organic or inorganic functional group.

10. The wet electrolytic capacitor of claim 8, wherein the organometallic compound is a primary amine, secondary amine, a tertiary amine, or a combination thereof.

11. The wet electrolytic capacitor of claim 8, wherein the ester of a fatty $C_1$-$C_{36}$ alkanoic acid and the sugar or derivative thereof, vitamin or a derivative thereof, glycerol or derivative thereof, or combinations thereof, is an ascorbyl alkanoate, a sorbitan alkanoate, a triglycerol monoalkanoate, a sucrose alkanoate, or a combination thereof.

12. The wet electrolytic capacitor of claim 11, wherein the gelation activator is ascorbyl palmitate, ascorbyl decanoate, ascorbyl laurate, ascorbyl caprylate, ascorbyl myristate, ascorbyl oleate, sorbitan monostearate, sorbitan laurate, sorbitan caprylate, sorbitan myristate, sorbitan oleate, glycerol palmitate, glycerol monodecanoate, glycerol monocaprylate, glycerol monostearate, glycerol monooleate, sucrose palmitate, sucrose monodecanoate, sucrose monostearate, sucrose laurate, sucrose caprylate, sucrose myristate, sucrose oleate, or a combination thereof.

13. The wet electrolytic capacitor of claim 8, wherein the gelation activator is a sorbitan alkanoate or 3-aminopropyltrimethoxysilane.

14. The wet electrolytic capacitor of claim 1, wherein the working electrolyte exhibits a conductivity of about 10 to about 100 milliSiemens per centimeter, determined at a temperature of 25° C.

15. The wet electrolytic capacitor of claim 1, wherein the anode is a planar anode and has a thickness of about 5 millimeters or less, wherein the planar anode has a D-shape or a cylindrical shape.

16. The wet electrolytic capacitor of claim 1, wherein the powder is formed from tantalum particles, wherein the tantalum particles are flake particles having an aspect ratio of from about 2 to about 100, and/or, wherein the cathode comprises a metal substrate that optionally includes titanium.

17. The wet electrolytic capacitor of claim 1, further comprising a conductive polymer layer disposed on the cathode, wherein the conductive polymer is a substituted polythiophene, wherein the substituted polythiophene is poly(3,4-ethylenedioxythiophene).

18. An implantable medical device comprising the wet electrolytic capacitor of claim 1.

19. A working electrolyte for a wet electrolytic capacitor, the working electrolyte comprising from about 1 wt. % to about 40 wt. % of at least one ammonium salt of an organic acid, from about 0.01 wt. % to about 10 wt. % of at least one acid, from about 0.5 wt. % to about 20 wt. % of inorganic oxide particles, from about 0.01 wt. % to about 2 wt. % of a gelation activator, from about 30 wt. % to about 80 wt. % of water, and from about 5 wt. % to about 40 wt. % of at least one secondary solvent, wherein the working electrolyte is in the form of a gel and has a pH value of from about 5.0 to about 8.0 and has a conductivity of from about 10 to about 100 milliSiemens per centimeter, determined at a temperature of 25° C.

20. The working electrolyte of claim 19, wherein the gelation activator comprises an ester of a fatty $C_1$-$C_{36}$ alkanoic acid and a sugar or derivative thereof, a vitamin or a derivative thereof, a glycerol or derivative thereof, or combinations thereof, an organometallic compound, or any combination thereof.

21. The working electrolyte of claim 20, wherein the organometallic compound has the following general formula:

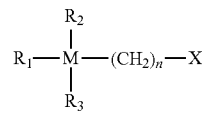

wherein,

M is an organometallic atom;

$R_1$, $R_2$, and $R_5$ are independently an alkyl or a hydroxyalkyl, wherein at least one of $R_1$, $R_2$, and $R_3$ is a hydroxyalkyl;

n is an integer from 0 to 8;

X is an organic or inorganic functional group, and/or wherein the ester of a fatty $C_1$-$C_{36}$ alkanoic acid and the sugar or derivative thereof, vitamin or a derivative thereof, glycerol or derivative thereof, or combinations thereof, is an ascorbyl alkanoate, a sorbitan alkanoate, a triglycerol monoalkanoate, a sucrose alkanoate, or a combination thereof.

22. A method for forming a wet electrolytic capacitor, the method comprising:

forming a mixture that comprises an ammonium salt of an organic acid, inorganic oxide particles, a gelation activator, an acid, and a solvent system that comprises water, activating gelation of the mixture so that it exhibits a first phase angle δ of from about 50° to 90°, wherein the gelation activator is present in an amount of about 0.01 wt. % to about 2 wt. % based upon the weight of the mixture;

placing the gelled mixture into communication with an anode, cathode, or both, wherein the anode comprises an anodically oxidized pellet formed from a pressed and sintered powder; and thereafter, allowing the mixture to further gel to form a working electrolyte that exhibits a second phase angle δ of from 0° to about 20°, wherein the working electrolyte further has a pH value of from about 5.0 to about 8.0, wherein the second phase angle is exhibited by the working electrolyte in about 4 hours to about 24 hours.

23. The method of claim 22, wherein an amount of the gelation activator is utilized in the working electrolyte such that the second phase angle is exhibited between about 6 hours and about 12 hours.

24. The method of claim 22, wherein the mixture is ultrasonically dispersed.

* * * * *